United States Patent [19]

Pälmer

[11] Patent Number: 4,924,907

[45] Date of Patent: May 15, 1990

[54] FLAP FOR AN AIR INLET OR OUTLET OPENING AT A MOTOR VEHICLE

[75] Inventor: Reinhard Pälmer, Tiefenbronn, Fed. Rep. of Germany

[73] Assignee: Dr. Ing. h.c.F. Porsche AG, Stuttgart, Fed. Rep. of Germany

[21] Appl. No.: 327,598

[22] Filed: Mar. 23, 1989

[30] Foreign Application Priority Data

Apr. 14, 1988 [DE] Fed. Rep. of Germany ....... 3812346

[51] Int. Cl.[5] ............................................ F16K 15/00

[52] U.S. Cl. ................................ 137/527.8; 55/385.3; 98/2.18

[58] Field of Search .................... 55/385.3; 98/2, 2.01, 98/2.18, 116, 119; 138/479, 527.8

[56] References Cited

U.S. PATENT DOCUMENTS

| | | | |
|---|---|---|---|
| 31,794 | 3/1861 | Evans | 98/119 X |
| 3,115,873 | 12/1963 | Hahn et al. | 137/479 X |
| 3,809,119 | 5/1974 | Cave | 137/527.8 |
| 4,063,570 | 12/1977 | Mitchell et al. | 137/527.8 X |
| 4,083,184 | 4/1978 | Ushijima et al. | 55/385.3 X |
| 4,548,166 | 10/1985 | Gest | 55/385.3 X |

FOREIGN PATENT DOCUMENTS 3420419 12/1986 Fed. Rep. of Germany .

*Primary Examiner*—Harold Joyce

*Attorney, Agent, or Firm*—Barnes & Thornburg

[57] ABSTRACT

A flap for an air inlet or outlet opening at a motor vehicle is connected with an adjacent stationary carrier part by a hinge arrangement. In order to reduce the actuating forces for the flap, while providing a simple construction, a thin-walled foil or fabric strip of a thermoplastic material is used as the hinge, which, on the one side, is connected with the flap and, on the other side, with the carrier part, the end areas of the flap and of the carrier part, which face the hinge, extending at a narrow distance from one another. This arrangement is particularly suited for formation of a ram-air actuated flap.

6 Claims, 1 Drawing Sheet

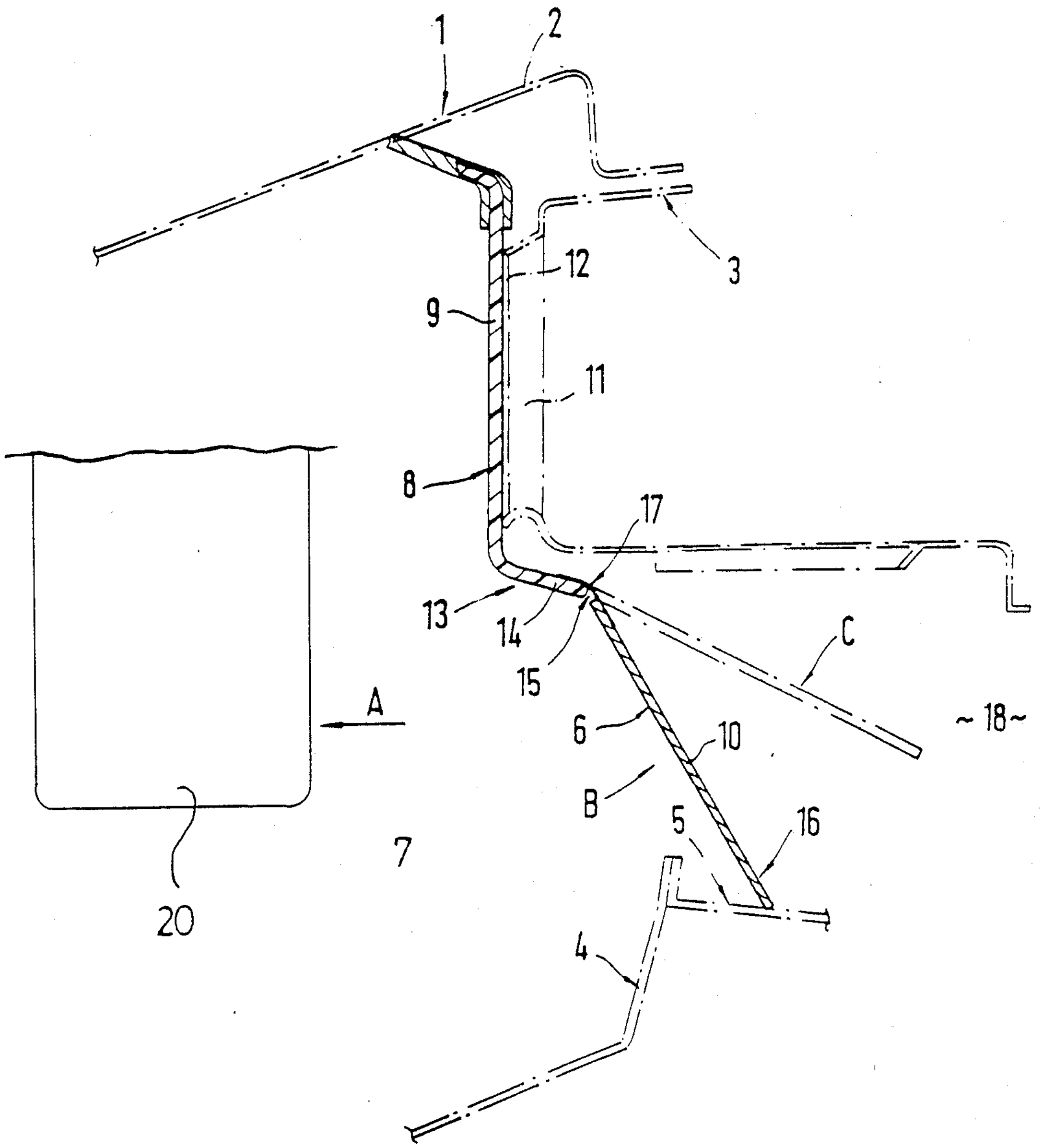
1
2
3
12
9
11
8
17
13
14
15
C
~18~
A
6
10
B
16
5
7
20
4

FLAP FOR AN AIR INLET OR OUTLET OPENING AT A MOTOR VEHICLE

BACKGROUND AND SUMMARY OF THE INVENTION

The present invention generally relates to a flap for an air inlet or outlet opening at a motor vehicle which is connected to an adjacent stationary carrier part by a hinge arrangement, and more particularly to such a hinge arrangement wherein the flap is connected to the carrier part by a thin-walled foil or fabric strip which permits the formation of a ram-air actuated flap.

From German Published Unexamined Patent Application (DE-OS) No. 34 20 419, a flap is disclosed for an air inlet or outlet opening at a motor vehicle, the flap being connected with the adjacent carrier part by of a film joint hinge. Injection-molded film joint hinges generally have the disadvantage that they have a relatively high bending resistance moment, so that relatively high forces are required for actuating the flap.

Thus it is an object of the present invention to provide a hinge arrangement between a carrier part and a flap in such a manner that, while the construction is simple, the actuating forces for this flap are reduced.

According to certain advantageous features of preferred embodiments of the present invention, these and other objects are achieved by connecting the flap with an adjacent stationary carrier part by a thin-walled foil or fabric strip. Other characteristics, which develop the invention advantageously, are contained in the following description and appended claims.

One particular advantage achieved by certain preferred embodiments of the present invention is that, as a result of the use of a thin-walled foil or fabric strip made of a thermoplastic material, a hinge for a flap is provided, which has a simple construction, in which case the actuating forces for this flap are reduced significantly as compared to a film joint hinge. For this reason, this type of a hinge is particularly suitable for a ram-air actuated flap.

Other objects, advantages and novel features of the present invention will become apparent from the following detailed description of the invention when considered in conjunction with the accompanying drawings.

BRIEF DESCRIPTION OF THE DRAWINGS

The single FIGURE of the present application is a vertical, sectional view of a flap for an air inlet or outlet opening at a motor vehicle in accordance with the teachings of the present invention.

DETAILED DESCRIPTION OF THE DRAWINGS

An embodiment of the invention is shown in the drawing and will be explained in detail in the following.

The FIGURE shows a partial area of a body, at 1, of a motor vehicle which, in the shown area, is formed by a stationary end part 2 arranged at the front end and a covered lock crossmember, generally indicated at 3, located below it. A radiator, at 4, extends at a vertical distance below this covered lock crossmember 3, an air inlet or outlet opening, generally indicated at 6, being provided between the covered lock crossmember 3 and an upper edge 5 of the radiator 4. Viewed in a forward driving direction A of the vehicle, an air filter 20 for an internal-combustion engine is provided in the space 7 in front of the covered lock crossmember 3. So that in stop-and-go traffic as well as at traffic light stops, no air heated by the radiator 4 can reach the air filter through the air inlet or air outlet opening 6, a partitioning element 8 is provided which is composed of a carrier part 9 and a flap 10 which is hinged to this carrier part 9.

The carrier part 9, which is preferably made of plastic, closes off slot openings 11 provided locally at the cover lock crossmember 3, and, by means of screws, adhesives, clips or the like, is connected with a vertically constructed wall 12 of the cover lock crossmember 3.

The carrier part 9, at 13, has an area 14 which slopes diagonally downward toward the rear of the vehicle and which, by means of a hinge 15, is hinged to the upper edge of the flap 10.

When the vehicle is stationary, the flap 10, as a result of its weight, closes the air inlet or outlet opening 6 (closed position B), so that no air that was heated by the radiator 4 can reach the air filter, which would result in a sputtering or hesitation of the internal-combustion engine or in an insufficient acceptance of gas. In the closed position B, a lower end 16 of the flap 10 rests against the upper edge 5 of the radiator 4. In the driving operation, a certain ram pressure exists in the area of the air filter according to the forward driving speed of the vehicle, this ram pressure automatically moving the flap 10 upward into an open position C. When the flap 10 is open, a sufficient amount of air will flow through the air inlet or outlet opening 6, through the engine compartment 18, to the internal-combustion engine.

The hinge 15 between the carrier part 9 and the flap 10 is formed by a thin-walled foil or fabric strip 17 made of, for example, a thermoplastic material which, on the one side, is connected with the flap 10 and, on the other side, with the carrier part 19, the end areas of the flap 10 and of the carrier part 9, which face the hinge 15, extending at a narrow distance from one another. The foil or fabric strip 17 may be connected with the flap 10 and the carrier part 9 by means of, for example, welding, gluing, clamping or the like.

In the embodiment illustrated in the single FIGURE, a foil or fabric strip 17 of a thickness of approximately 0.2 mm made of polypropylene is provided which, by high-frequency welding, is connected with the areas of the carrier part 9 and of the flap 10 which, viewed in driving direction A, are located adjacent to one another at the rear. The flap 10, which preferably extends over a significant part of the width of the vehicle and is constructed approximately rectangularly, is made of, for example, plastic.

The foil or fabric strip 17 preferably extends over the whole width of the flap 10 or of the opening 6 of the body 1.

A hinge 15 of this type is suitable for air inlet and outlet flaps in the heating and air-conditioning area of a vehicle and, in particular, for ram-air actuated flaps 10 for the supplying and removing of air to and from the engine compartment of motor vehicles. Naturally this type of a hinge 15 may also be used for outside-power actuated flaps 10.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A flap for at least one of an air inlet and outlet opening at a motor vehicle, the flap being connected with an adjacent stationary carrier part made of plastic by a hinge, wherein a thin-walled foil or fabric strip, made of a plastic material, is used as the hinge which is connected with the flap and with the carrier part by welding or gluing, end areas of the flap and of the carrier part facing the hinge extending at a narrow distance from one another.

2. A flap according to claim 1, wherein the foil or fabric strip is fastened at the flap and at the carrier part by welding, gluing, clamping or the like.

3. A flap according to claim 1, wherein an approximately vertically aligned edge of the flap, which is located on top, is connected with the carrier part arranged above it by means of the foil or fabric strip.

4. A flap according to claim 1, wherein the foil or fabric strip is made of polypropylene.

5. A flap according to claim 1, wherein the thin-walled foil or fabric strip is made of a thermoplastic material.

6. A flap for at least one of an air inlet and outlet opening at a motor vehicle, the flap being connected with an adjacent stationary carrier part made of plastic by a hinge, wherein a thin-walled foil or fabric strip, made of plastic, is used as the hinge which is connected with the flap and carrier part by welding or gluing, end areas of the flap and carrier part facing the hinge extending at a narrow distance from one another, wherein the flap is provided between an engine compartment and a space, which has an air filter and, viewed in a forward driving direction of the vehicle, is disposed farther in front, the flap being closed when the vehicle is stationary and being opened automatically by means of ram air during a driving operation.

* * * * *